United States Patent

Rice et al.

[11] Patent Number: 6,131,377
[45] Date of Patent: *Oct. 17, 2000

[54] DEEP GROOVE ROLLER FOR MOWER HEAD ASSEMBLY

[76] Inventors: James Rice, 22008 Vine Rd., Brier, Wash. 98036; Robert E. Erickson, 15720 104th Ave. NE., Bothell, Wash. 98011

[*] Notice: This patent issued on a continued prosecution application filed under 37 CFR 1.53(d), and is subject to the twenty year patent term provisions of 35 U.S.C. 154(a)(2).

[21] Appl. No.: 09/181,577

[22] Filed: Oct. 28, 1998

Related U.S. Application Data

[63] Continuation of application No. 08/723,264, Sep. 30, 1996, Pat. No. 5,829,235.

[51] Int. Cl.⁷ ............................................. A01D 34/44
[52] U.S. Cl. ............................... 56/7; 56/249; 56/294; 56/DIG. 20
[58] Field of Search ............................ 56/7, 249, 294, 56/250, 251, 252, 253, 254, DIG. 20

[56] References Cited

U.S. PATENT DOCUMENTS

| | | | |
|---|---|---|---|
| 1,385,007 | 7/1921 | Kerr | 56/249 |
| 2,528,116 | 10/1950 | Clemson | 56/249 |
| 2,639,572 | 5/1953 | Goeske | 56/249 |
| 2,830,429 | 4/1958 | Goeske | 56/249 |
| 2,912,813 | 11/1959 | Ellsworth | 56/249 |
| 3,118,268 | 1/1964 | Benz | 56/255 |
| 3,662,528 | 5/1972 | Akgulian et al. | 56/249 |
| 3,895,481 | 7/1975 | Olney et al. | 56/17.5 |
| 3,952,482 | 4/1976 | Quick | 56/139 |
| 4,947,630 | 8/1990 | Rich et al. | 56/249 |
| 5,394,681 | 3/1995 | Nolan et al. | 56/249 |
| 5,511,365 | 4/1996 | Rice | 56/7 |

FOREIGN PATENT DOCUMENTS

| | | |
|---|---|---|
| 0 382 527 | 8/1990 | European Pat. Off. ......... 56/DIG. 10 |
| 1 384 | of 1859 | United Kingdom . |
| 3 201 | of 1861 | United Kingdom . |

OTHER PUBLICATIONS

R&R Products Co., Catalog pages—"Greensmower" and Part Drawing No. R68577 dated Oct. 22, 1990.

*Primary Examiner*—H. Shackelford
*Attorney, Agent, or Firm*—Dowrey & Associates

[57] ABSTRACT

A deep groove ground-contacting roller for a reel type mower assembly having a plurality of interfitting intermediate roller segments and matching end segments mounted on a transverse bearing mounted axle rod in tight abutment. Stop rings engage the end segments and the axle rod to fix the roller segments on the rod to form a roller body. Each roller segment includes a cylindrical hub and a disc element extending radially therefrom with converging planar annular side surfaces intersecting to form a rounded ground-contacting ridge. The disc elements and the hub sections combine to form a deep groove with angled side surfaces and a right circular cylindrical bottom.

26 Claims, 2 Drawing Sheets

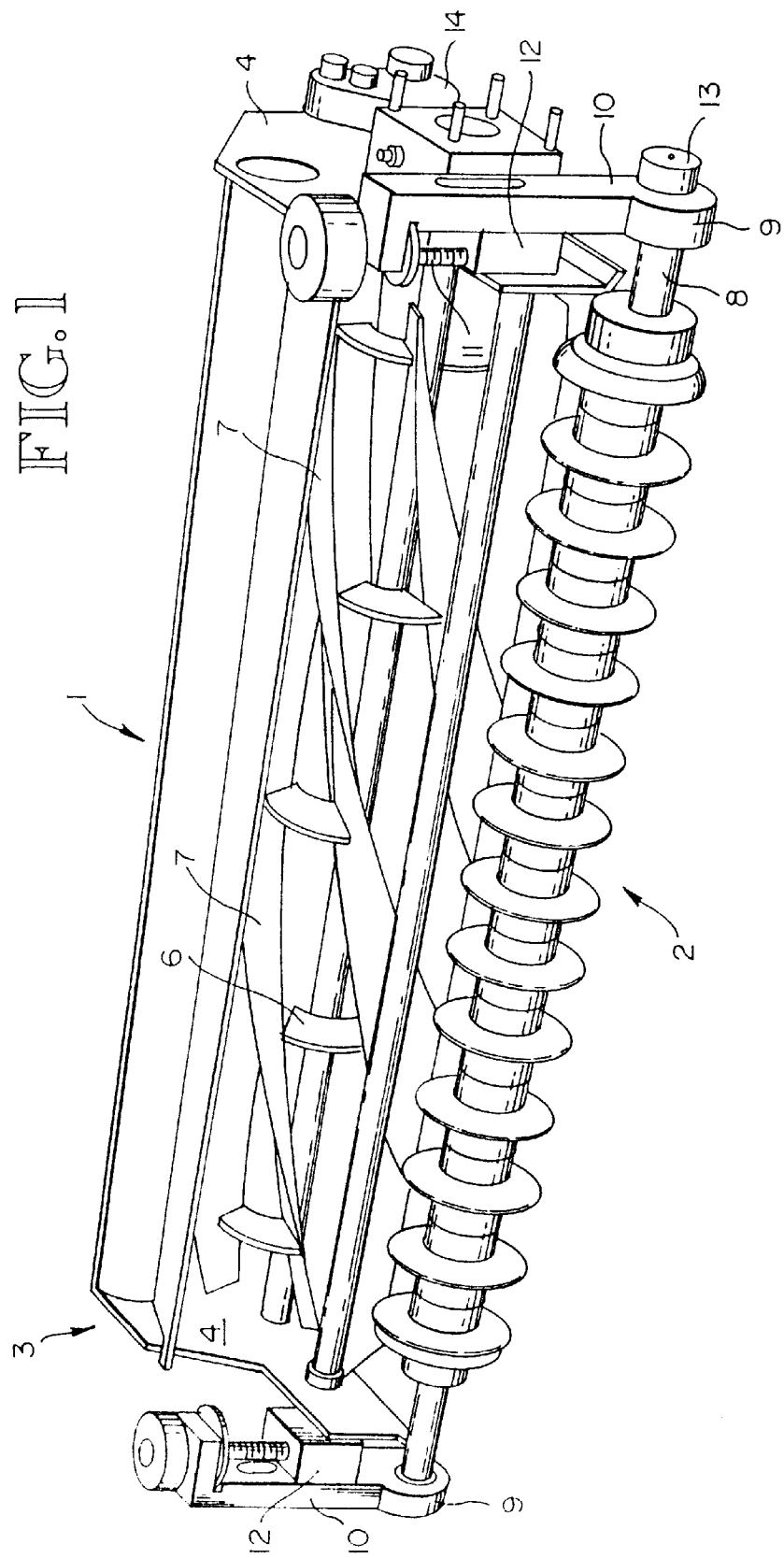

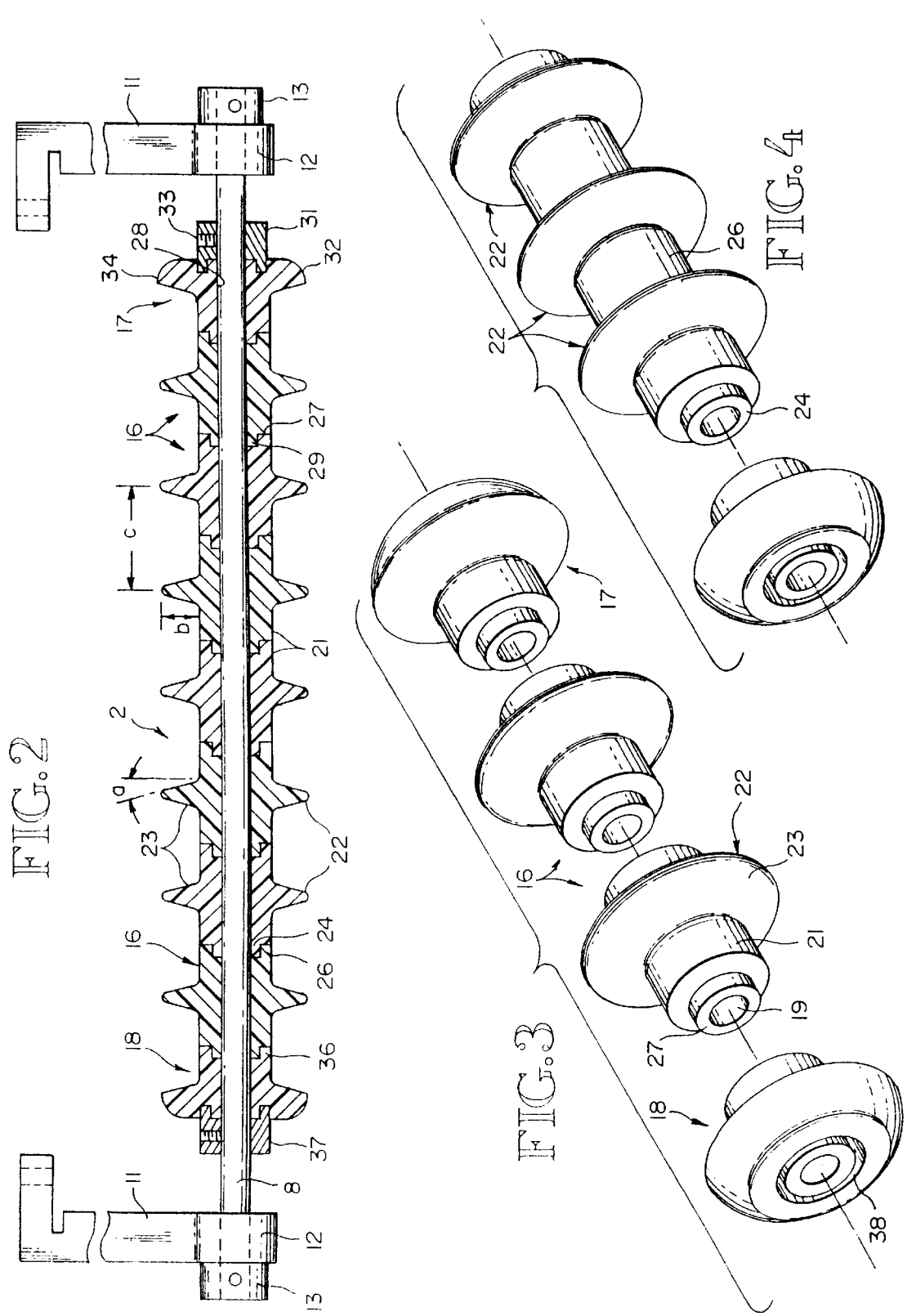

DEEP GROOVE ROLLER FOR MOWER HEAD ASSEMBLY

This application is a continuation of application Ser. No. 08/723,264 filed Sep. 30, 1996, now U.S. Pat. No. 5,829,235.

BACKGROUND OF THE INVENTION

1. Field of the Invention

The present invention relates to ground contacting rollers commonly used on reel type mower head assemblies designed for golf course or cemetary mowing or other mowing where precision cutting is required. The present invention relates more specifically to a grooved roller having a configuration which provides greater cutting accuracy and efficiency for use on fairway and green cutting as well as off-fairway mowing particularly when used to control the mower blade height adjustment.

2. Description of the Prior Art

Although smooth-surface lawn mower rollers have been used in the past and are still in widespread use, it is well recognized that providing some form of annular grooving or relief on the roller surface enhances the performance and reliability of the roller. When used as front rollers, i.e. ahead of the reel mower blade, prior art grooved rollers have achieved some degree of success in lessening the amount of grass that is laid flat prior to cutting. Other problems, such as the accumulation of debris in the nature of acorns, pine cones, small stones and other objects, are however heightened by the presence of grooves in the roller. Since most greens and lawns are frequently mowed following watering or for some reason are in a wet condition, the problem of grass clipping accumulation on the roller surface also becomes significant. This problem has not been solved by prior art grooved roller designs. The front roller, which precedes the cutting reel, is vertically adjustable relative to the mower blade and acts as a depth gauge to control the height and accuracy of the cut. Since fairways are maintained at approximately ½ inch height and greens even less, any appreciable build-up tending to increase the diameter of the roller becomes a very real problem. Since watering of golf course greens and fairways is done at night and most mowing is done during the morning hours, the problem is persistent. Under these conditions the depth gauge rollers may sometimes even double in diameter with the accumulation of wet grass clippings requiring frequent shut-down and cleaning, especially on green areas.

U.S. Pat. No. 5,394,681 to Nolan et al and U.S. Pat. No. 5,511,365 to Rice are examples of roller configurations which utilize relatively shallow grooves, sometimes referred to as a wave configuration. These grooved rollers avoid some of the problem of grass laydown but do not solve the problem of debris accumulation and wet grass clipping build-up. The roller of the Nolan U.S. Pat. No. 5,394,681, for instance, utilizes a fairly shallow groove or depression, which is susceptible to debris and grass clipping build-up which interferes with the depth gauge functioning of the roller. Additionally, since the surface on the Nolan roller is in the form of a shallow wave, the depth of the grooves is insufficient to accommodate the grass height on fairways which may be in the order of ½ inch and certainly does no more than lay the grass down when operating outside the greens and fairways. The Rice patent which also utilizes a wave type pattern on the roller surface when viewed in cross section suffers from the same shortcomings since the wave troughs are extremely shallow.

Other attempts at shallow groove rollers such as the Akgulian et al U.S. Pat. No. 3,662,528 and the Olney et al U.S. Pat. No. 3,895,481 suffer from the same shortcomings as the prior two patents discussed. Additionally these patents utilize a roller configuration wherein the edges of the raised portions of the roller surface are sharp and tend to act as a scraper or turf cutting element when the mower is turned. The presence of sharp edges and the vertical sides of the small grooves of these patents also aggravate the debris build-up and grass clipping accumulation problem.

Still other patents such as U.S. Pat. No. 4,947,630 to Rich et al and British Patents Nos. 1384 and 3201, although using a somewhat deeper groove, utilize a groove configuration with opposing vertical or curved sides which aggravates the debris collection problem. Additionally, the Rich et al patent utilizes an assembly of sharp edged discs to form the grooves, severely aggravating the problem of tearing the turf when the mower is turned.

It must also be borne in mind that substantial weight is carried on the relatively small diameter depth gauge rollers of the type under consideration. Overall roller distortion may result from rough terrain or obstructions and, if the material of the roller is thin enough, mushrooming of the ridge portions of the rollers may occur. Both of these phenomena result in increased tendency for debris collection and grass clipping build-up. In the Rich et al patent an attempt is made to address the problem of debris build-up by the use of a transversely extending rod 22 located adjacent the surface of the ridges of the roller. The problem with this type of roller clearing is that, the roller body, roller surface and the rod 22 may all become distorted, rendering the cleaning rod ineffective.

SUMMARY OF THE INVENTION

The present invention provides a roller for a reel type mower assembly which comprises an elongated body made up of individual identical intermediate roller segments and end segments designed to be carried on a metal shaft or axle, mounted for free rotation in bearings external to the roller body. The roller segments are precisely formed so that, when tightly pressed together between pressure-fit end caps anchored to the cross axle; the entire roller assembly rotates in unison. In the preferred embodiment, the intermediate segments are so formed as to be identical. Right and left hand end segments have male and female configurations such that only three different configurations are necessary in order to assemble a complete roller body of any selected standard length. This feature allows for replacement of damaged individual roller segments and selective expanding or reduction of the roller length with only three different inventoried parts. Hence, although multiple diverse intermediate and end roller segment configurations with interfitting surfaces are disclosed, in the broadest scope of the invention, the number and axial length of the segments is not limited and is intended to encompass integral roller bodies with repeated pattern configurations. Likewise the detailed interfacing of the segments may be varied without departing from the broader scope of the invention.

The ground engaging surface of the roller comprises a series of adjacent spaced radiused annular ridges. Flat cylindrical surfaced groove bottoms have inclined frusto conical side surfaces joining the groove bottoms to the rounded annular ridge edges. The distance provided between the ridge edges may range from 1 to 2 inches along the axis of the roller and the depth of the groove formed between the annular ridges may be approximately ¾ of an inch. The side surfaces of the ridges are upwardly inclined to a plane at right angles to the axis of the roller of from 12°–20°. The roller segments are formed from a plastic material, preferably an ultra-high molecular weight (UHMW) polyethylene plastic. Although the disclosed preferred embodiment illustrates only one disc element forming a single ground-contacting ridge for each individual roller segment, it will be understood that the segments may be axially extended with multiple disc elements formed on a single segment utilizing the chosen axial spacing between disc elements. With this configuration, the grooves in the roller surface will not collect debris commonly found on lawns and golf courses because of the inclined surfaces of the groove, the flat cylindrical bottom surface of the grooves and the axial distance between side surfaces of the grooves. Since the surface area provided by the rounded edges of the annular ridges is minimal and any wet grass clippings accumulating in the deep grooves will be discharged prior to any significant build-up, the depth gauge function of the roller is not affected. With the narrow width rounded edges of the ridges, no plowing or scraping of the turf is experienced during mower turns. Because the grooves are approximately ¾ of an inch deep, the roller may be used on both greens and fairways alike with minimal or no appreciable lay-down of grass. Additionally the rollers may be used for off-fairway mowing, where grass heights as much as 2–2½ inches may be encountered, without significant grass lay-down problems. With the deep groove and wide ridge spacing, effective cutting of off-fairway areas may be done with the same roller as used on fairways and greens. Still further advantages of the deep groove and separated round-ridge edge configuration apply to use in cemetaries which utilize flat ground level stone markers. These stones are designed to be mown over for reduced maintenance costs, the only hazard being the tendency for chipping by hardened metal rollers. With the present roller configuration, and especially with plastic roller bodies, these problems are alleviated even in instances of raised stone edges or corners and the like.

BRIEF DESCRIPTION OF THE DRAWINGS

Further advantages of the roller assembly of the present invention will be apparent from the following description with reference to the accompanying drawings in which:

FIG. 1 is a perspective view of a mower head which incorporates the roller assembly of the present invention;

FIG. 2 is a cross sectional view of the roller assembly mounted in support bearings;

FIG. 3 is an exploded isometric showing the intermediate and end roller segments; and FIG. 4 is an exploded isometric view showing an end and an intermediate roller segment with multiple discs.

DETAILED DESCRIPTION OF THE PREFERRED EMBODIMENT

FIG. 1 illustrates the mower head 1 to which a roller assembly 2 of the present invention is mounted. The particular mower head 1 illustrated is the type adapted to be attached to a tractor. Typically, multiple mower heads 1 are attached to a tractor so that it can be driven over large expanses of turf such as are found in golf courses or in parks. The mower head 1 includes a frame 3 to which the other components of the head are mounted. The frame 3 includes a pair of end plates 4 with a rotatably mounted reel 6 having blades 7. As the mower head 1 passes over a section of turf, reel 6 rotates so that the underlying grass is cut between the blades 7 and a bed knife (not shown) that extends between the end plate 4 adjacent the bottom of the mower head 1 in a conventional manner.

As may be seen in FIG. 1, the ground engaging roller assembly 2 is carried on a transverse axle rod 8 which has its opposite ends journaled for rotating in bearings 9. Bearings 9 are carried on the bottom ends of the vertically adjustable posts 10 which comprise the mower depth gauge or height adjustment for the cut made by the reel 6. In the present illustrated embodiment, the posts 10 may be vertically adjusted by means of the adjustment screws 11 mounted in the blocks 12 carried on the forward ends of plates 4. The vertical depth gauge arrangement is conventional and may vary according to individual mower head manufacturers. It will be understood that the axle rod 8 is freely rotatable in the bearings 9 and retained in place by means such as the end caps 13 fixed thereto by set screws or the like as illustrated. In addition to the adjustable front roller 2, the mower assembly may also include a rear fixed roller (not shown) carried in the rear mounting bracket 14.

FIGS. 2 and 3 illustrate the details of the "deep groove" roller of the present invention. The roller is made up a series of identical intermediate roller segments 16, a right hand end segment 17 as viewed in FIG. 2 and left hand end segment 18. As aforementioned, the intermediate roller sections 16 and end segments 17 and 18 are preferably formed from solid plastic material and in particular an ultra-high molecular weight (UHMW) polyethylene plastic. A suitable UHMW plastic for forming the roller body segments is sold by Menasha Corporation of Fort Wayne, Ind. under the trademark TIVAR®-100. This material is a high strength plastic and the segments may be either machined from a solid piece or may be formed by any molding process such as injection molding.

Each intermediate roller segment has a central bore 19 for mounting the section on the axle rod 8. The bore 19 is sized so as to snugly slide onto the rod 8. Each section has a right cylindrical hub or boss 21 extending in both directions axially from the ridge forming disc 22. As illustrated in FIG. 2, each disc 22 has inclined converging frusto conical side surfaces 23 extending at an angle a of approximately 15° to a plane at right angles to the axis of the rod 8. Although the preferred angle is 15°, the angle of the side surfaces 23 may range from 12°–20°. As also illustrated in FIG. 2 the outer annular edges of the disc 22 formed by the intersection of the side surfaces are provided with a radius so as to avoid any sharp edges which would tear the turf when the roller is caused to drag during turning motion of the mower. Likewise a radius is provided between the side surfaces 23 and the central hub 21 to avoid any sharp angles which would tend to hold debris.

The roller segments 16, as shown in FIGS. 2 and 3, may be identical and each hub 21 is provided with a cylindrical extension 24 of reduced diameter on one end and an annular bore or recess 26 in the opposite face. The diameter of the recess is the same as the diameter of the extension 24 so as to form a snug mating engagement between the segments. With this arrangement, the discs 16 may be slid onto the axle rod and mated with a tight press fit to form the roller body as shown in FIG. 2. One end of the roller body has an end segment 17 with a hub 27 and a through bore 28 corresponding in diameter to the hubs 21 and bores 19 of the intermediate sections 16. The hub portion 27 is provided with a cylindrical extension 29 for engaging the recess 26 in the intermediate segment 16 when mounted on the rod 8 as shown in FIG. 2. A metal stop ring 31 is mounted on the rod 8 and has an annular projection 32 for engaging an annular recess in the end face of the segment 17. The projection 32 will have a pressure fit with the annular recess in the section 17 for firm attachment and may be fixed in position on the rod 8 by such means as the set screw 33. The end segment 17 also includes an annular disc formation 34 forming the end ridge of the roller.

The end segment 18 at the left end of the rod 8 may be identical in cross section with the segment 17 except for the formation of a recess 36 designed to receive the projection 24 on the last intermediate segment 16. The end segment 18 is engaged by the stop ring 37 which has an annular projection engaging an annular recess 38 in the end of the segment 18. The stop ring 37 is fixed on a rod 8 in the same manner as the stop ring 31. With this arrangement, it will be seen that the grooved roller formation is fixed on the shaft 8 and rotates with the shaft in the bearings 12.

As aforementioned, the intermediate segments may be axially extended with multiple disc elements formed on a single segment, utilizing the chosen axial spacing between disc elements. This relationship is illustrated in FIG. 4 wherein the extended unitary hub segment 21a is provided with three discs 22 spaced on the hub according to the chosen axial spacing. It will be understood that the opposite ends of the hub 21a will be provided with a cylindrical extension 24 and recesses 26 respectively as previously described relative to the hubs 21 for mating engagement between segments. Likewise, it will be understood that the end segments may be provided with multiple disc elements as described.

Referring to FIG. 2, it has been determined that the preferred depth b of the grooves formed by the ridge forming discs 22 and the cylindrical surface of the hubs 21 is approximately ¾ of an inch. This depth enables a roller to be used when mowing greens as well as fairways, normally maintained at a ½ inch height. The natural lower limit of the stated approximate depth b is thus ½ inch which avoids undersirable grass lay-down. An approximate ¾ inch groove depth also permits off-fairway cutting without appreciable grass lay-down. The upper limit of the depth b will depend on structural limitations which, for the type of roller under consideration, is normally no more than 1 inch. With this depth any accumulation of grass clippings or other debris on the surface of hubs 21 will be thrown off before any interference is experienced with the depth gauge function of the roller. It has also been determined that, for best results, the distance c between the ridges formed by the discs 22 should range from between approximately 1–2 inches with 1½ inches being the preferred spacing. The distance between the ridges, the depth of the grooves and the angle of the side faces of the discs 22 combine to prevent any possible debris pick-up or accumulation of wet grass clippings.

It is to be understood that the foregoing description and accompanying drawings have been given by way of illustration and example. It is also to be understood that changes in form of the several parts, substitution of equivalent elements and arrangement of parts which will be readily apparent to one skilled in the art, are contemplated as within the scope of the present invention, which is limited only by the claims which follow.

What is claimed is:

1. In combination with a mower head assembly having vertically adjustable transversely spaced bearing mounts for receiving oppposite terminal ends of a roller shaft, a deep groove ground-contacting roller body comprising:

a roller shaft adapted for mounting in said bearing mounts for free rotation therein, a plurality of roller segments carried in abutting relation on said shaft and extending between the terminal ends thereof, means for locking said roller segments in fixed transverse position on said shaft for rotation therewith, each said roller segments having an abutting hub section with at least one raised disc element extending radially outwardly therefrom, each said disc element including opposing frusto conical side surfaces extending radially outwardly from the associated hub section, said side surfaces being inclined so as to converge and join to form a ground-contacting annular ridge edge, said abutting hub sections and said disc elements forming a series of annular grooves in said roller body having angled side walls and a bottom surface, each of said grooves having a radial depth of from ½ to 1 inch.

2. The roller body of claim 1 wherein said roller segments comprise first and second end roller segments and at least one intermediate roller segment, said first and second end roller segments being carried on said shaft adjacent the respective opposite terminal ends of said shaft in abutment with the associated intermediate segment, the disc element on each said end segments including at least one inclined frusto conical side surface adjacent the associated intermediate segment.

3. The roller body of claim 2 including;

a plurality of identical intermediate roller segments in abutting relation on said shaft, said hub sections comprise right circular cylindrical surfaces, and said ground-contacting ridge edges being provided with a transverse radius of curvature.

4. The roller body of claim 1 wherein said grooves have a radial depth of from 0.6 to 1 inch.

5. A mower assembly ground-contacting roller body comprising;

a cylindrical hub, a plurality of raised disc elements extending radially outwardly from said hub, each said disc element including opposing frusto conical side surfaces extending outwardly from said hub, said side surfaces being inclined so as to converge and join to form a ground-contacting annular ridge, the cylindrical surface of said hub and said disc elements forming a series of annular grooves in said roller body having angled side walls and a bottom surface, each of said grooves having a radial depth of from ½ to 1 inch.

6. The roller body of claim 5 wherein;

the side surfaces of said disc elements are inclined at an angle of from 10°–20° to a plane normal to the axis of said hub, and said ridge edges are axially spaced a distance of from 1 to 2 inches.

7. The roller body of claim 6 wherein;

said side surfaces are inclined at an angle of 15° to a plane normal to the axis of said hub, said ridge edges are axially spaced a distance of 1 ½ inches, and the radial depth of said annular grooves is ¾ inches.

8. The roller body of claim 5 wherein said annular ridge is provided with a transverse radius of curvature.

9. The roller body of claim 5 wherein said cylindrical hub comprises a plurality of roller segments, each said segments including a hub section with at least one said disc elements extending therefrom, and each said hub sections including a male and a female interfitting hub face on the opposite respective ends thereof, whereby said roller segments may be pressed into tight engagement.

10. The roller body of claim 5 wherein said grooves have a radial depth of from 0.6 to 1 inch.

11. The roller body of claim 6 wherein said grooves have a radial depth of from 0.6 to 1 inch.

12. The roller body of claim 9 wherein said grooves have a radial depth of from 0.6 to 1 inch.

13. A mower assembly ground-contacting roller body comprising;

first and second end roller segments and a plurality of intermediate abutting roller segments therebetween, each said roller segments having an abutting hub section with at least one raised disc element extending radially outwardly therefrom, each said at least one raised disc element on said intermediate segments including opposing frusto conical side surfaces extending outwardly from the associated hub section, said side surfaces being inclined so as to converge and join to form a ground-contacting annular ridge, the at least one raised disc element on each said end segments including an inclined frusto conical side surface adjacent the associated intermediate segment, said abutting hub sections and said disc elements forming a series of annular grooves in said roller body having angled side walls and a bottom surface, each of said grooves having radial depth of from ½ to 1 inch.

14. The roller body of claim 13 wherein said ridges are axially spaced a distance of from 1 to 2 inches.

15. The roller body of claim 14 wherein said ridges are axially spaced a distance of 1 ½ inches.

16. The roller body of claim 13 wherein the radial depth of said grooves is ¾ inches.

17. The roller body of claim 13 wherein said grooves have a radial depth of from 0.6 to 1 inch.

18. A mower assembly ground-contacting roller body comprising;

a hub, a plurality of raised disc elements extending radially outwardly from said hub, each said disc element including opposing frusto conical side surfaces extending outwardly from said hub, said side surfaces being inclined so as to converge and join to form a ground-contacting annular ridge, the surface of said hub and said disc elements forming a series of annular grooves in said roller body having angled side walls and a bottom surface, each said grooves having a radial depth of from ½ to 1 inch.

19. The roller body of claim 18 wherein said ridges are axially spaced a distance of from 1 to 2 inches.

20. The roller body of claim 18 wherein the side surfaces of said disc elements are inclined at an angle of from 12°–20° to a plane normal to the axis of said hub.

21. The roller body of claim 19 wherein the side surfaces of said disc elements are inclined at an angle of from 12°–20° to a plane normal to the axis of said hub.

22. The roller body of claim 21 wherein the radial depth of said grooves is ¾ inches.

23. The roller body of claim 22 wherein said ridges are axially spaced a distance of 1½ inches.

24. The roller body of claim 23 wherein said side surfaces are inclined at an angle of 15° to a plane normal to the axis of said hub.

25. The roller body of claim 18 wherein said grooves have a radial depth of from 0.6 to 1 inch.

26. The roller body of claim 21 wherein said grooves have a radial depth of from 0.6 to 1 inch.

\* \* \* \* \*